United States Patent
Nagasawa

(10) Patent No.: US 6,707,908 B1
(45) Date of Patent: Mar. 16, 2004

(54) TELEPHONE TERMINAL DEVICE

(75) Inventor: Naokazu Nagasawa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 604 days.

(21) Appl. No.: 09/664,650

(22) Filed: Sep. 19, 2000

(30) Foreign Application Priority Data

Sep. 21, 1999 (JP) .......................................... 11-267516

(51) Int. Cl.$^7$ .............................. H04M 1/00; H04M 3/00
(52) U.S. Cl. ............................ 379/374.01; 379/373.01; 379/373.03; 379/373.02; 379/373.04; 455/567
(58) Field of Search ............................ 379/372, 373.01, 379/373.02, 373.03, 373.04, 374.01, 374.02, 374.03, 375.01, 376.01; 455/567; 84/636, 609–614

(56) References Cited

U.S. PATENT DOCUMENTS

| | | | | |
|---|---|---|---|---|
| 5,739,759 A | * | 4/1998 | Nakazawa et al. | 340/825.44 |
| 5,918,303 A | * | 6/1999 | Yamaura et al. | 84/609 |
| 6,075,998 A | * | 6/2000 | Morishima | 455/567 |
| 6,124,543 A | * | 9/2000 | Aoki | 84/609 |
| 6,175,072 B1 | * | 1/2001 | Aoki | 84/636 |
| 6,192,372 B1 | * | 2/2001 | Yamaura et al. | 707/104 |
| 6,198,407 B1 | * | 3/2001 | Koga | 340/825.44 |
| 6,245,984 B1 | * | 6/2001 | Aoki et al. | 84/611 |
| 6,337,972 B1 | * | 1/2002 | Jones et al. | 455/567 |
| 6,501,967 B1 | * | 12/2002 | Makelaet et al. | 455/567 |
| 6,556,255 B1 | * | 4/2003 | Kim et al. | 348/734 |

FOREIGN PATENT DOCUMENTS

| | | |
|---|---|---|
| EP | 0 933 917 A1 | 8/1999 |
| GB | 2 353 442 A | 2/2001 |
| JP | 7-295581 | 11/1995 |
| JP | 9-7355 | 1/1997 |
| JP | 9-244643 | 9/1997 |

* cited by examiner

*Primary Examiner*—Rexford Barnie
(74) *Attorney, Agent, or Firm*—Pearne & Gordon LLP

(57) ABSTRACT

Telephone terminal device in that a memory part comprises a plurality of melody memories storing a plurality of melody data. The melody memories store the editing condition including the number of pieces of music in the medley reproduction, the reproduction time for each piece of music, the fade-in/fade-out time for each piece of music, the titles, and the order of the pieces of music, with the melody data. In reproducing the receipt sound, the plurality of melody data stored in the melody memories are read out successively by the medley editing and reproducing part of the control part based on the preset editing condition so as to be reproduced as a medley.

9 Claims, 7 Drawing Sheets

FIG. 2

13a: MELODY A MEMORY

| MELODY A MEDLEY |
| --- |
| 1. CLASSICS AT DAWN |
| 2. CLASSICS IN THE MORNING |
| 3. CLASSICS IN THE AFTERNOON |
| 4. CLASSICS IN THE TWILIGHT |
| 5. CLASSICS IN THE EVENING |
| 6. CLASSICS AT MIDNIGHT |
| |
| |

13b: MELODY B MEMORY

| MELODY B MEDLEY |
| --- |
| 1. PIANO PIECES AT DAWN |
| 2. PIANO PIECES IN THE MORNING |
| 3. PIANO PIECES IN THE AFTERNOON |
| 4. PIANO PIECES IN THE TWILIGHT |
| 5. PIANO PIECES IN THE EVENING |
| 6. PIANO PIECES AT MIDNIGHT |
| |
| |

13c: MELODY C MEMORY

| MELODY C MEDLEY |
| --- |
| 1. POPS AT DAWN |
| 2. POPS IN THE MORNING |
| 3. POPS IN THE AFTERNOON |
| 4. POPS IN THE TWILIGHT |
| 5. POPS IN THE EVENING |
| 6. POPS AT MIDNIGHT |
| |
| |

13d: MELODY D MEMORY

| MELODY D MEDLEY |
| --- |
| 1. TRADITIONAL POPULAR SONGS AT DAWN |
| 2. TRADITIONAL POPULAR SONGS IN THE MORNING |
| 3. TRADITIONAL POPULAR SONGS IN THE AFTERNOON |
| 4. TRADITIONAL POPULAR SONGS IN THE TWILIGHT |
| 5. TRADITIONAL POPULAR SONGS IN THE EVENING |
| 6. TRADITIONAL POPULAR SONGS AT MIDNIGHT |
| |
| |

14: MELODY E MEMORY

| MELODY E MEDLEY |
| --- |
| 1. MARCHES AT DAWN |
| 2. MARCHES IN THE MORNING |
| 3. MARCHES IN THE AFTERNOON |
| 4. MARCHES IN THE TWILIGHT |
| 5. MARCHES IN THE EVENING |
| 6. MARCHES AT MIDNIGHT |
| |
| |

FIG. 7A
PLEASE SELECT THE GENRE OF MELODIES.

MELODY A MEMORY —15
MELODY B MEMORY
MELODY C MEMORY —25
MELODY D MEMORY
MELODY E MEMORY

23

FIG. 7B
PLEASE SELECT A MELODY OR A MEDLEY.

MELODY B MEDLEY
1. PIANO PIECES AT DAWN
2. PIANO PIECES IN THE MORNING
3. PIANO PIECES IN THE AFTERNOON
4. PIANO PIECES IN THE TWILIGHT

FIG. 7C
PLEASE INPUT THE MEDLEY REPRODUCTION CONDITION.

INTRODUCTION SCAN TIME : 5.0 SECONDS
FADE-IN/FADE-OUT TIME : 1.0 SECOND
NUMBER OF PIECES OF : 4 PIECES
MUSIC IN THE MEDLEY

FIG. 7D
PLEASE SELECT THE FIRST PIECE.
1. PIANO PIECES AT DAWN
2. PIANO PIECES IN THE MORNING
3. PIANO PIECES IN THE AFTERNOON
4. PIANO PIECES IN THE TWILIGHT
5. PIANO PIECES IN THE EVENING

FIG. 7E
PLEASE SELECT THE SECOND PIECE.
1. PIANO PIECES AT DAWN
2. PIANO PIECES IN THE MORNING
3. PIANO PIECES IN THE AFTERNOON
4. PIANO PIECES IN THE TWILIGHT
5. PIANO PIECES IN THE EVENING

FIG. 7F
PLEASE SELECT THE THIRD PIECE.
2. PIANO PIECES IN THE MORNING
3. PIANO PIECES IN THE AFTERNOON
4. PIANO PIECES IN THE TWILIGHT
5. PIANO PIECES IN THE EVENING
6. PIANO PIECES AT MIDNIGHT

FIG. 7G
PLEASE SELECT THE FOURTH PIECE.
1. PIANO PIECES AT DAWN
2. PIANO PIECES IN THE MORNING
3. PIANO PIECES IN THE AFTERNOON
4. PIANO PIECES IN THE TWILIGHT
5. PIANO PIECES IN THE EVENING

FIG. 7H
WOULD YOU LIKE TO REGISTER THE SETTING CONTENT?

YES

RESET

FIG. 7I
RETURN TO THE WAITING STATE.

TELEPHONE TERMINAL DEVICE

BACKGROUND OF THE INVENTION

The present invention relates to a telephone terminal device for reproducing a melody as a receipt sound. More specifically, it relates to a telephone terminal device with a medley editing function for enabling reproduction of a plurality of melodies edited as a medley.

In most of telephone terminal devices such as portable telephone devices, the receipt is notified by a simple electronic sound. It becomes difficult to judge which portable telephone device has received a call among those thereabout by a similar electronic sound with the portable telephone devices propagated. Therefore, some of the portable telephone devices having about 10 pieces of receipt melodies preliminarily registered in a memory so as to allow optional selection of the receipt melody therefrom have been put into practice.

However, although the selection of the melodies preliminarily registered differs slightly depending on the type and the manufacturer, since pieces of music favored by a relatively large number of people are selected, a person having a portable telephone device with the same piece of music selected as the receipt melody may be nearby. In the case a person having the same type is around, the possibility that the same piece of music has been selected as the receipt melody is higher. Therefore, it has actually been the case that a user, who heard a receipt melody, understood it is the receipt melody of his own portable telephone device, but the portable telephone device of another person with the same piece of music set as the receipt melody has received a call.

As mentioned above, according to the conventional telephone terminal devices, in the case a plurality of devices are around, whether the receipt sound is of oneself or of another one may not be well distinguished, and thus confusion may be brought about at the time of receipt at a crowded place.

Accordingly, portable telephone devices having a function of registering an original piece of music as the receipt melody with ten keys have appeared, but it is more convenient if whether the receipt melody is of oneself or of another one can be distinguished using about 10 pieces of receipt melodies beforehand registered in a memory. Moreover, it is also convenient if a plurality of favorable pieces of music from about 10 pieces of the receipt melodies can be enjoyed with a preferable order.

SUMMARY OF THE INVENTION

In light of the above-mentioned circumstances, an object of the invention is to provide a telephone terminal device capable of reproducing a plurality of receipt melodies preliminarily registered in an optional combination as a medley so as to improve the distinguishing ability for the receipt state of one's own device.

A first aspect of the invention is a telephone terminal device comprising a melody data memory means for storing melody data, a sound data processing means for reproducing the melody data as the sound, and a medley editing and reproducing means for reproducing a plurality of melody data stored in the melody data memory means as an edited medley based on a preset editing condition at the time of reproducing a receipt sound.

Moreover, a second aspect of the invention is the telephone terminal device, wherein the medley editing and reproducing means sets the number of pieces of music in the medley reproduction as the editing condition for editing and reproducing the melody data based on the editing condition. A third aspect of the invention is the telephone terminal device, wherein the medley editing and reproducing means sets the reproduction time for each piece of music in the medley reproduction as the editing condition for editing and reproducing the melody data based on the editing condition. A fourth aspect of the invention is the telephone terminal device, wherein the medley editing and reproducing means sets the fade-in/fade-out time for each piece of music in the medley reproduction as the editing condition for editing and reproducing the melody data based on the editing condition. A fifth aspect of the invention is the telephone terminal device, wherein the medley editing and reproducing means sets the titles of the pieces of music in the medley reproduction as the editing condition for editing and reproducing the melody data based on the editing condition. A sixth aspect of the invention is the telephone terminal device, wherein the medley editing and reproducing means sets the order of the pieces of music in the medley reproduction as the editing condition for editing and reproducing the melody data based on the editing condition.

Furthermore, a seventh aspect of the invention is the telephone terminal device, wherein the medley editing and reproducing means sets a combination of at least two selected from the group consisting of the number of pieces of music, the reproduction time for each piece of music, the fade-in/fade-out time for each piece of music, the titles of the pieces of music, and the order of the pieces of music in the medley reproduction as the editing condition for editing and reproducing the melody data based on the editing condition.

Moreover, an eighth aspect of the invention is the telephone terminal device, wherein the melody data memory means stores the melody data per each group, and stores the medley editing conditions corresponding to each melody data group.

Furthermore, a ninth aspect of the invention is the telephone terminal device, wherein the melody data memory means includes a built-in first memory device provided fixedly in the telephone terminal device, and a second memory device connected detachably to the medley editing and reproducing means.

A tenth aspect of the invention is the telephone terminal device, wherein the medley editing and reproducing means has an ordinary reproduction mode for reproducing a medley of pieces of music based on the melody data at the time of receipt, and a monitor reproduction mode for reproducing the melody data according to the reproduction command as the operation modes for reproducing the receipt sound.

According to the above-mentioned configuration, a plurality of melody data stored in the melody data memory means are reproduced as a medley by the medley editing and reproducing means based on the preset editing condition at the time of reproducing the receipt sound when an incoming call is received. For example, the melody data are read out successively from the melody data memory means based on the editing condition so as to reproduce the melody of the predetermined number of pieces of music for a predetermined time one by one. As the editing condition, any one or a combination selected from the group consisting of the number of pieces of music, the reproduction time for each piece of music, the fade-in/fade-out time for each piece of music, the titles of the pieces of music, and the order of the pieces of music in the medley reproduction is set. Accordingly, a plurality of receipt melodies preliminarily registered can be reproduced in an optional combination as a medley so that the distinguishing ability of the receiving state of the telephone terminal device can be improved. Therefore, even in the case the same telephone terminal device is nearby, receipt of one's own device can be distinguished easily from receipt of another device. In reproducing a medley, the medley editing operation can be executed easily by presetting the editing condition such as the number of pieces of music in the medley reproduction.

Moreover, since the melody data memory means stores the melody data per each group, and stores the medley editing conditions corresponding to each melody data group, the melody data and the editing condition can be selected, read or written easily and quickly so that the melody data can be administered or accessed easily. Furthermore, since the melody data memory means includes a built-in first memory device provided fixedly in the telephone terminal device, and a second memory device connected detachably to the medley editing and reproducing means via an interface means so that the built-in melody memory and the detachable melody memory for the external memory device can be handled in the same manner, the content of the receipt melody can be changed optionally by replacing the melody memory according to the trend or the taste.

Moreover, in addition to the medley reproduction at the time of receipt according to an ordinary reproduction mode, the melody data can be reproduced as a single melody or a medley at any time according to the reproduction command from the user in a monitor reproduction mode. Accordingly, a desired melody can be reproduced optionally for a listen. dr

BRIEF DESCRIPTION OF THE DRAWINGS

FIG. 2 is an explanatory diagram showing the conceptual configuration of the data registration content in the melody memories of the telephone terminal device according to the embodiment;

FIGS. 7A to 7I are explanatory diagrams showing the transition of the display part at the time of the medley edition setting operation in this embodiment.

DETAILED DESCRIPTION OF THE PREFERRED EMBODIMENTS

Hereinafter an embodiment of the invention will be explained with reference to the drawings.

Figure 1:
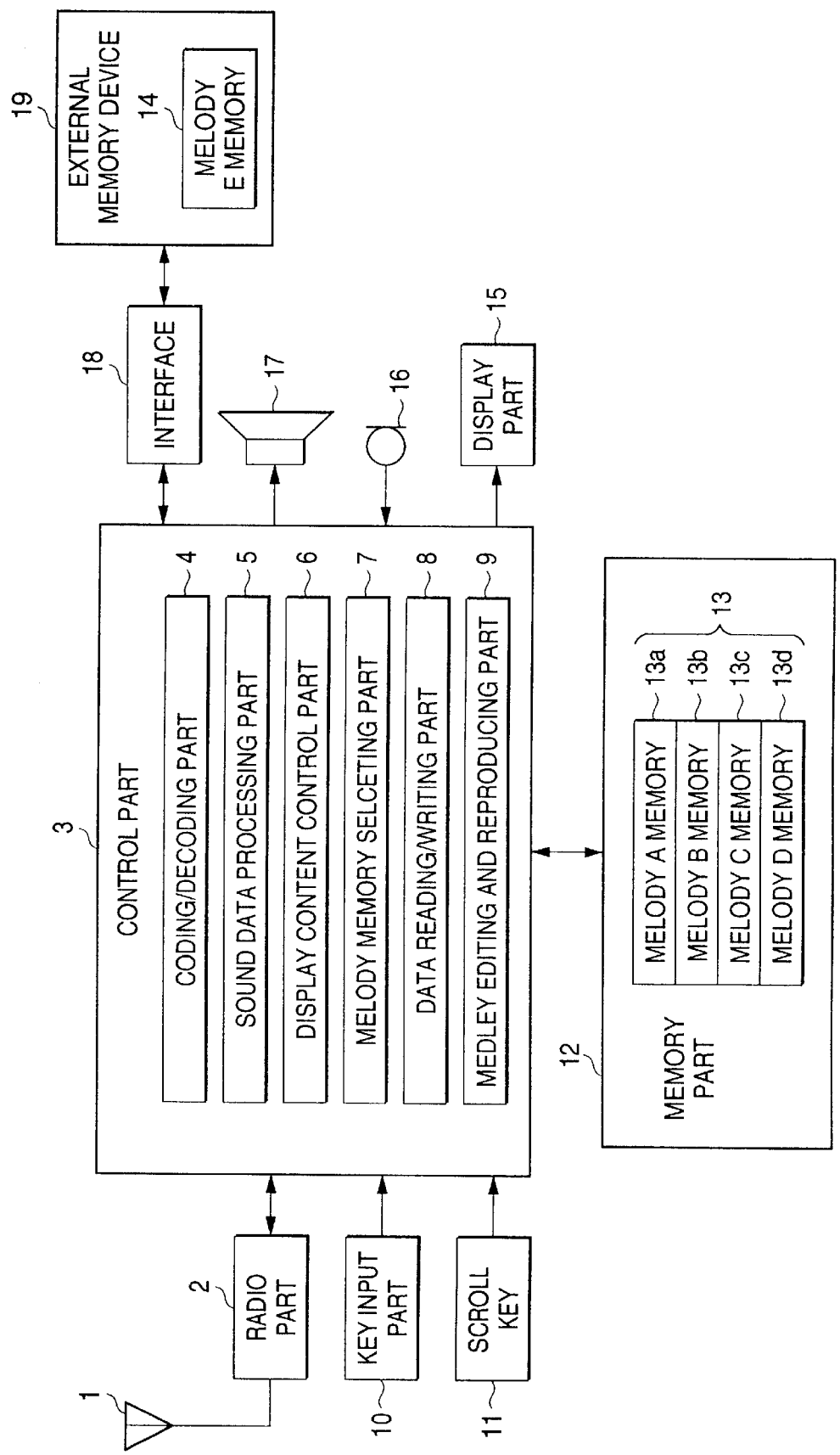
FIG. 1 is a block diagram showing the configuration of a telephone terminal device according to an embodiment of the invention.

FIG. 1 is a block diagram showing the configuration of a telephone terminal device according to an embodiment of the invention. A portable telephone device is presented here as an example of the telephone terminal device.

The portable telephone device comprises an antenna 1 for transmitting or receiving a radio signal, a radio part 2 for the modulation/demodulation process of the radio signal to be transmitted or received, a control part 3 for the operation control of each part, a key input part 10 including ten keys and special keys for the input command, a scroll key 11 for the scrolling operation of the display screen, a memory part 12 corresponding to the melody data memory means for storing melody data corresponding to the receipt melody, a display part 15 comprising a liquid crystal display for indicating the operation state such as the telephone number of the communication counterpart and the receipt state, time, various functions and the setting screen, a transmitting part 16 comprising a microphone, and a receiving part 17 comprising a speaker.

The control part 3 comprises a coding/decoding part 4 for coding/decoding a transmitting signal and a receiving signal, a sound data processing part 5 corresponding to the sound data processing means for the data process for reproducing the melody data as the sound, a display content control part 6 for controlling the display content on the display part 15, a melody memory selecting part 7 for selecting the melody memory in the memory part 12, a data reading/writing part 8 for reading and writing data with respect to the melody memory, and a medley editing and reproducing part 9 corresponding to the medley editing and reproducing means for the data process for editing a plurality of melody data for the reproduction as a medley. The control part 3 is realized according to the functional configuration to be operated by the MPU or DSP based on a control program stored in a memory medium such as a memory.

The memory part 12, divided in a plurality of memory areas, comprises four built-in melody memories 13 (first memory device) including a melody A memory 13a, a melody B memory 13b, a melody C memory 13c, and a melody D memory 13d in this embodiment. Moreover, as an exterior type melody memory (second memory device), an external memory device 19 comprising a melody E memory 14 is provided. The external memory device 19 is to be connected detachably with the control part 3 via an interface 18. The external memory device 19 may comprise a plurality of memory areas.

The conceptual configuration of the melody memory is shown in FIG. 2. For example, the title of each melody and the melody data are preliminarily stored and registered in each melody memory 13a to 13d, 14. In FIG. 2, data representing the editing condition for producing the medley is preset and registered instead of the data of the melody itself in the melody A medley, or the like shown in the uppermost row of each melody memory. As the editing condition, the number of pieces of music, the reproduction time for each piece of music (time of the introduction scan for successively reproducing the initial part of each piece of music), the fade-in/fade-out time for each piece of music, the titles of the pieces of music, and the order of the pieces of music in the medley reproduction are stored for writing and reading.

In the portable telephone device according to this embodiment, a receipt melody or a medley of receipt melodies are selected and set preliminarily as the receipt sound according to the operation of the key input part 10 by the user. At the time of receipt, the electric wave from a base station (not illustrated) is received by the antenna 1 and inputted to the radio part 2 so that the receipt is detected by a receipt detecting means (not illustrated) in the control part 3. When the receipt is detected, the melody memory 13 storing the melody data set for the receipt is selected so that the melody data are read out by the data reading/writing part 8. The medley editing process is executed for the melody data by the medley editing and reproducing part 9 based on the editing condition. The melody data are converted to a sound signal by the sound data processing part 5 so that the receipt melody is reproduced and outputted from the receiving part 17.

When the incoming call is accepted according to the operation of the key input part 10, various signal process is executed by the radio part 2, the coding/decoding part 4 and the sound data processing part 5 for the communication so that the transmitted sound inputted from the transmitting part 16 is coded and modulated for transmission as well as the received sound demodulated and decoded based on the received signal is outputted from the receiving part 17.

Figure 3:
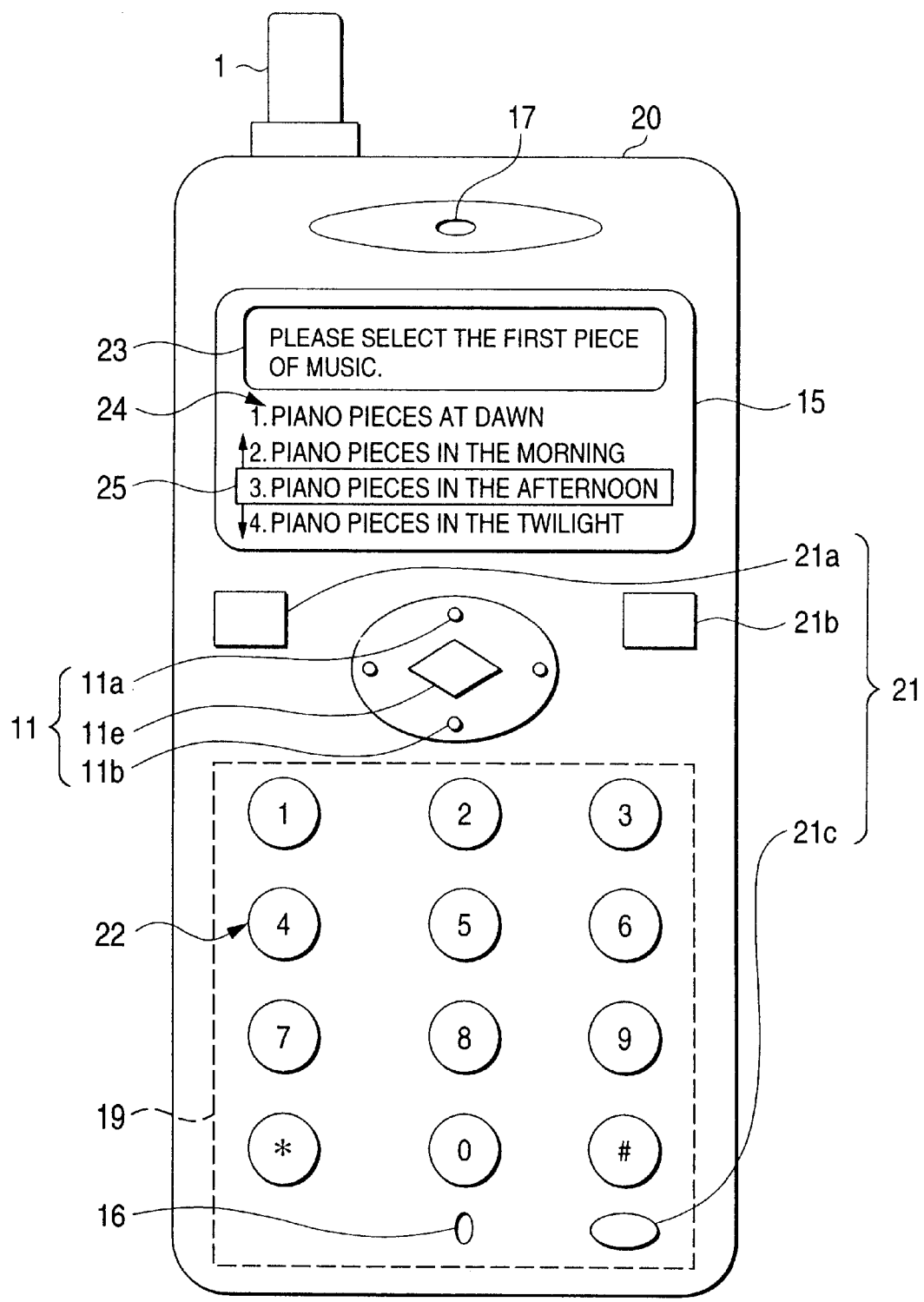
FIG. 3 is a plan view showing the operation surface side of the portable telephone device according to the embodiment.

FIG. 3 is a plan view showing the operation surface side of the portable terminal device according to this embodiment. A housing 20 of the portable telephone device comprises the antenna 1, the display part 15, the transmitting part 16, the receiving part 17, special keys 21a, 21b, 21c and ten keys 22 of the key input part 10, and the scroll key 11. Moreover, the external memory device 19 comprising an IC memory is mounted and stored inside the housing so as to be connected with the control part 3 by the interface (not illustrated).

The display part 15 displays the items necessary for the communication, the telephone number, the numbers, characters, and icons related to other functions. As an example, the display content at the time of selecting the receipt melody is shown here. As a help screen 23, a message corresponding to the key operation is displayed in the upper part of the display screen. Therebelow are titles 24 of the melodies registered in the melody memory are indicated. A cursor 25 indicated as a thick frame is movable in the upper and lower direction as shown by the arrow. The upward or downward movement of the cursor 25 is commanded by the press of either the upper scroll key 11a or the lower scroll key 11b of the scroll key 11. The melody is selected by moving the cursor 25 on the title of the desired melody and pressing a confirmation key 11e. Control on the display and the input is executed based on the control program in the control part 3.

Figure 4:
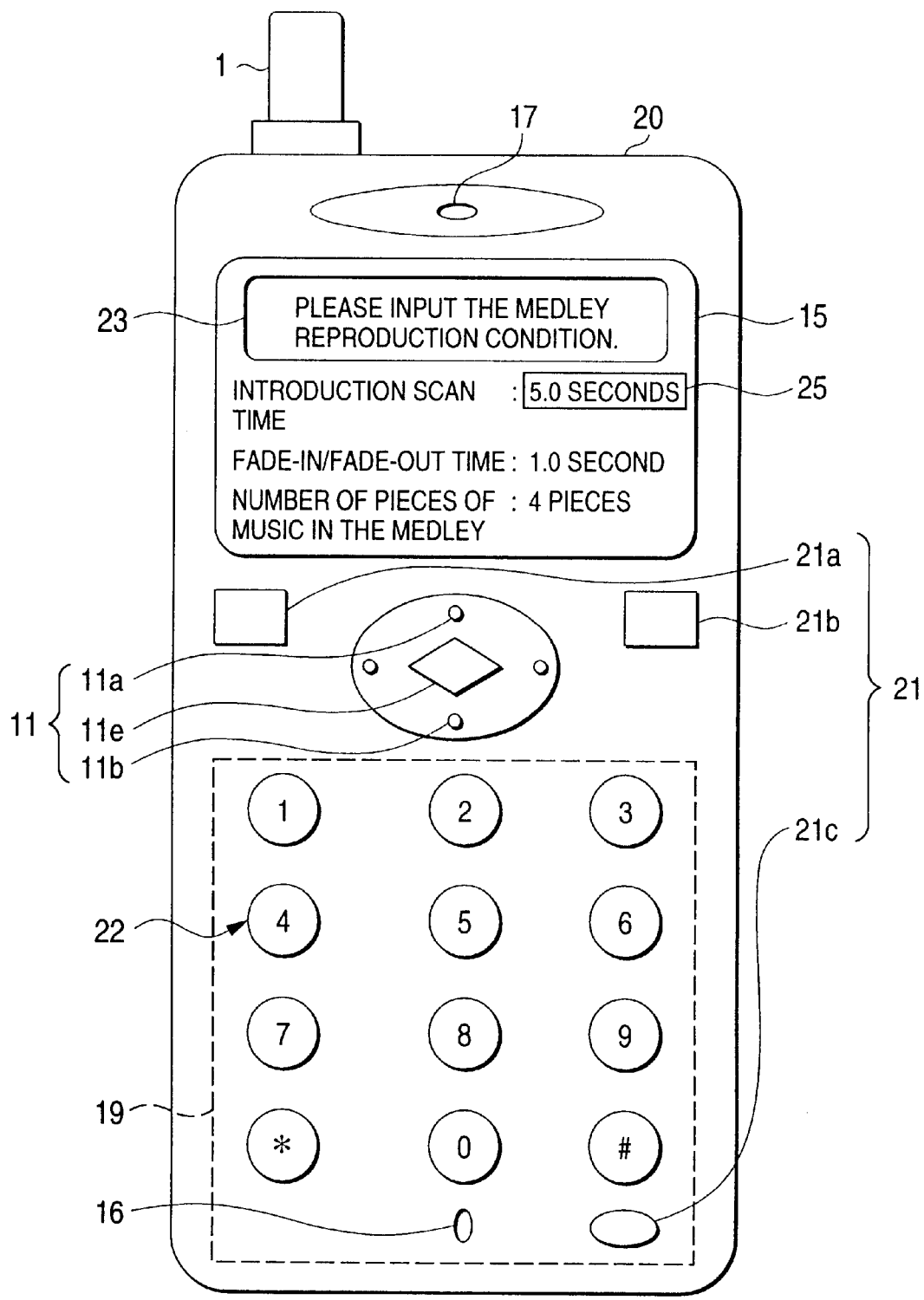
FIG. 4 is a plan view showing the operation surface side of the portable telephone device in the medley editing condition setting mode.

Next, the medley editing method for the receipt melody in this embodiment will be explained with reference to FIGS. 4 and 5. FIG. 4 is a plan view showing the operation surface side of the portable telephone device in the medley editing condition setting mode. FIGS. 5A and 5B are explanatory diagrams showing the timing transition of the medley reproduction state. The transition of the maximum value of the volume of each piece of music in the reproduced medley with respect to the time axis and the transition of the reproduced piece of music are shown therein.

In the case of reproducing the receipt melody medley, the pieces of music and the editing condition are preset by the user for the medley edition. In setting the medley edition, first, the medley editing condition is set in the editing condition setting mode. As shown in FIG. 4, the message "Please input the medley reproduction condition." in the help screen 23 of the display part 15 for requiring the input of three items including the introduction scan time, the fade-in/fade-out time, and the number of pieces of music in the medley. The user inputs the above-mentioned items with the ten keys 22 and the scroll key 11.

The introduction scan time is the time for reproducing the individual melody data registered in the melody memories from the top of the piece of music. A inputted numerical value is handled as the seconds for the reproduction. According to the control program of the control part 3, in the case a mark other than a number, for example, the * mark is inputted, all the melody data for one piece of music will be reproduced. In FIGS. 5A and 5B, T1 and T3 correspond to the introduction scan time.

Moreover, the fade-in/fade-out time denotes the time for controlling the volume at the time of changeover from a piece of music to another one such that the volume of the former one is gradually reduced and the volume of the latter one is gradually increased. That is, it is the time for linking the pieces of music. Also here an inputted numerical value is handled as the seconds. In the case the inputted numerical value is "0", the fade-in/fade-out operation is not executed. In FIGS. 5A and 5B, T2 and T4 correspond to the fade-in/fade-out time. Here, V1 and V2 denote the maximum volume of the melody.

Figure 5A:
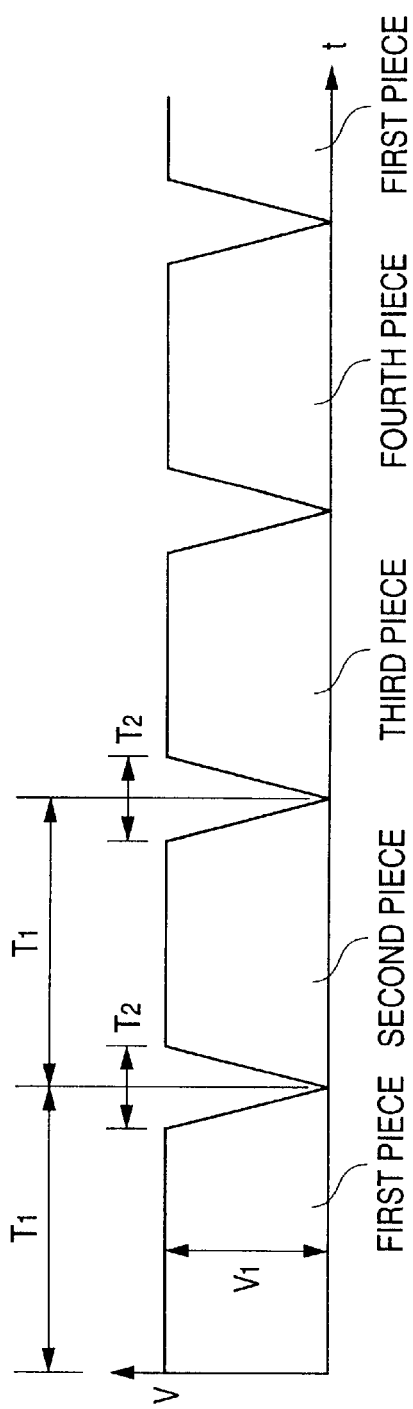
FIGS. 5A and 5B are explanatory diagrams showing the timing transition of the medley reproduction state in this embodiment.
Figure 5B:
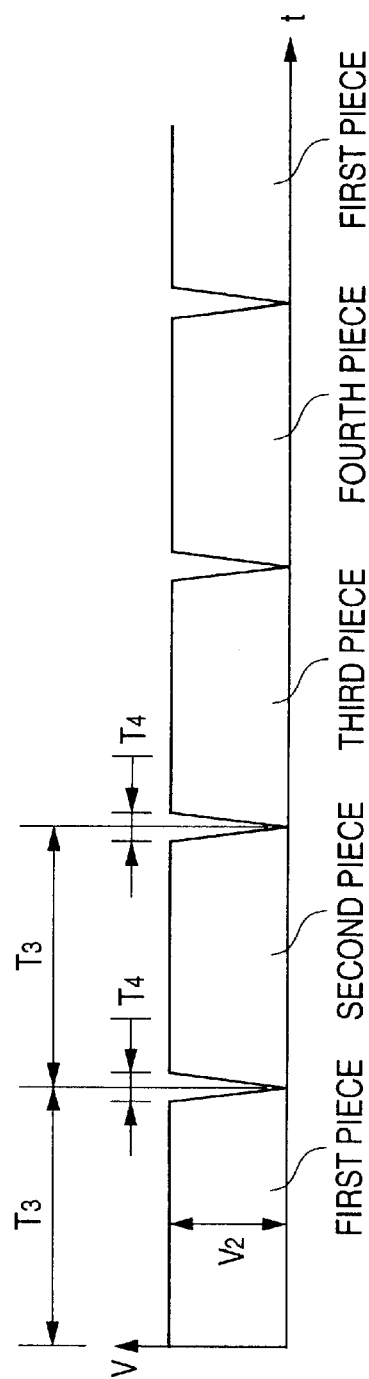

According to the comparison between FIGS. 5A and 5B, it is easily understood that the medley reproduction content varies by changing the three items including the introduction scan time, the fade-in/fade-out time, and the number of pieces of music in the medley. The reproduction volume can be set or changed independently from the editing condition setting.

Figure 6:
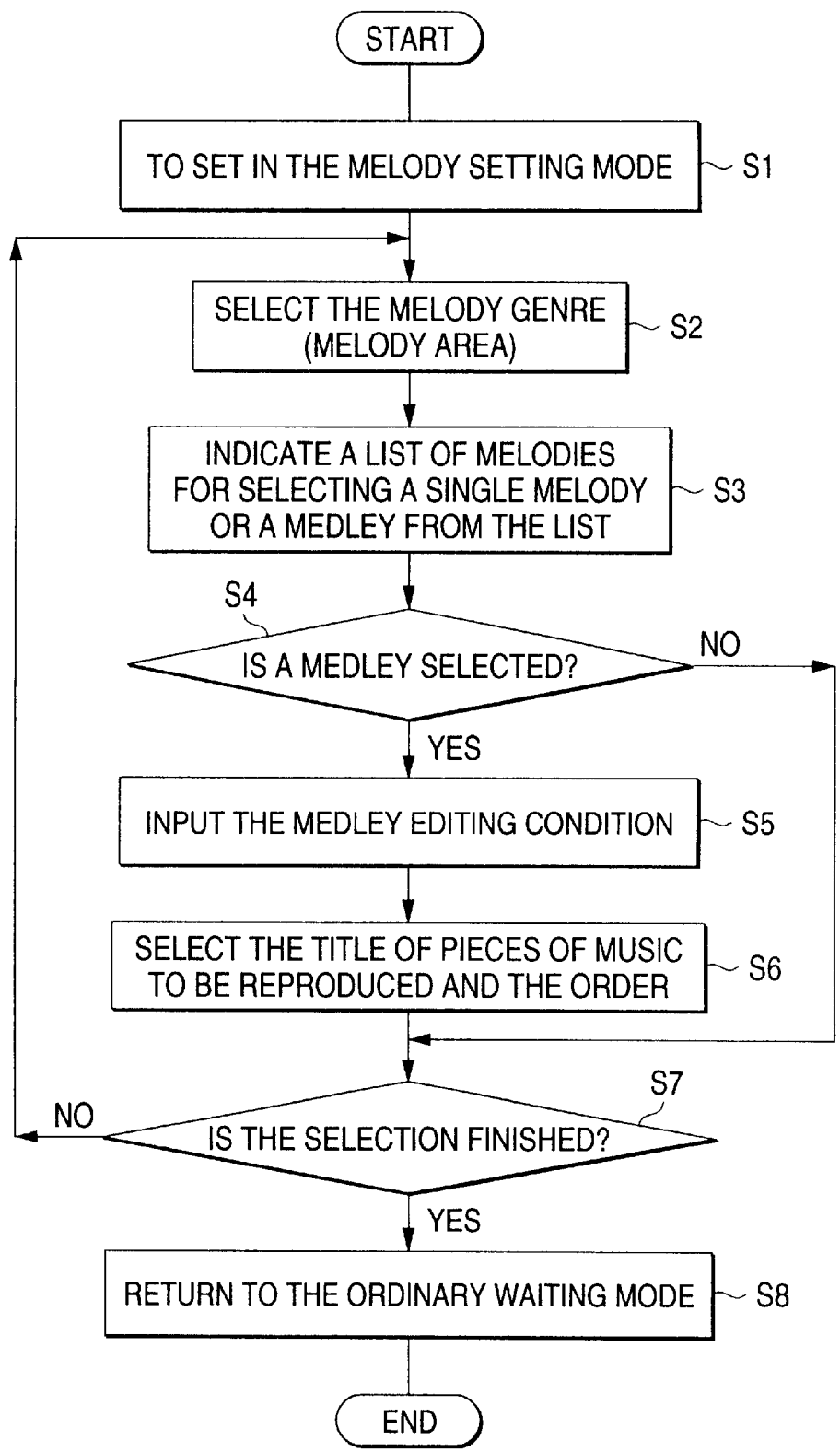
FIG. 6 is a flow chart showing the setting procedure in the medley edition in this embodiment.

The medley editing operation of the receipt melody in this embodiment will be explained with reference to FIGS. 6 and 7A to 7I. FIG. 6 is a flow chart showing the setting procedure in the medley edition, and FIGS. 7A to 7I are explanatory diagrams showing the transition of the display part at the time of the medley edition setting operation. The operation control for each part here is executed based on the control program in the control part 3.

The user, first, presses the special key 21c to serve as the function key, and inputs a number from the ten keys 22 for setting the device in the melody setting mode (step S1). The message in FIG. 7A is displayed on the display part 15 so as to switch the device into the melody setting mode. According to the help message "Please select the melody genre." on the help screen 23, the user presses the scroll key 11 for moving the cursor 25 to the optional position in the vertical direction, and presses the configuration key 11e for selecting the melody genre (step S2). As shown in FIG. 2, melody data are divided in each genre and stored in each memory area of a plurality of the melody memories 13 in the memory part 12. The memory area of the melody data corresponding to the selected genre is selected.

When the melody genre is selected, the display screen of the display part 15 is switched to FIG. 7B so as to display a list of melodies. Then, the user moves the cursor 25 onto the character display showing the melody or medley to be reproduced as the receipt sound with the scroll key 11, and presses the confirmation key 11e for selecting a single melody or a medley from the list of melodies (step S3). Here whether or not a medley is selected is judged (step S4). In the case a medley is selected, as mentioned above, the medley editing condition is set (step S5) and the titles and the order of pieces of music are set (step S6).

At the time, since the display screen of the display part 15 is switched to FIG. 7C, the user moves the cursor 25 onto the editing condition to be inputted with the scroll key 11 for inputting the number of a setting value with the ten keys 22. As a preset value, for example, "introduction scan time: 5.0 seconds, fade-in/fade-out time: 1.0 second, number of pieces of music in the medley: 4 pieces" are registered and displayed so that an optional numerical value can be overwritten thereon.

When the editing condition is inputted as to the above-mentioned three items, the display screen of the display part 15 is switched to FIG. 7D. the user moves the cursor 25 onto the character display showing the melody for the medley reproduction with the scroll key 11 according to the help message on the help screen 23, and presses the confirmation key 11e for selecting the melodies successively. As the first, second, third and fourth pieces of music are selected, the display screen of the display part 15 is switched to FIGS. 7D, 7E, 7F, and 7G.

When a predetermined number of pieces of music are selected, the melody data of the selected melodies are read out for the medley edition, and are reproduced as a medley for monitoring. As shown in FIGS. 5A and 5B, the medley is to be reproduced in the circulation such that when reproduction of the set number of pieces of music is finished, the first one is reproduced again. Since the message of FIG. 7H is shown in the display part 15 during the reproduction of the set medley, if the user would like to register the set content, he moves the cursor 25 onto "YES" and presses the confirmation key 11e for registering the editing condition. As shown in FIG. 2, the data representing the medley editing condition are stored in the uppermost row (top area) of each melody memory, for example, like the melody B medley in the melody B memory 13b. Although the memory area (such as the melody B memory) for the medley data of the melody memory stores only the editing condition data, it may store the melody data obtained consequently by the medley edition.

At the time, whether or not selection of a melody or a medley is finished is judged (step S7). In the case the selection is finished, the return process to an ordinary waiting mode is executed (step S8). In the case the editing condition is being registered, the message as shown in FIG. 7I is displayed on the display part 15. When the registration is completed, the device is switched to the ordinary waiting mode so that a display of a waiting state (not illustrated) is shown.

As mentioned above, in the case an incoming call is received in the portable telephone device according to this embodiment with the medley edition setting operation executed, the receipt melody medley is reproduced as the receipt sound. That is, at the time of receipt, the melody data are read out from the melody memory 13 of the memory part 13 selected for the receipt by the medley editing and reproducing part 9 of the control part 3 so that the melodies of the selected pieces of music are played in the order of the selection by the set introduction scan time according to the medley editing condition. The receipt melody is reproduced as a medley such that the fade-in/fade-out operation is executed for reducing or increasing the volume at the time of transition from the former piece of music to the latter so that the link of the pieces can be provided smoothly.

Although the case of setting the number of pieces of music to be reproduced, the introduction scan time, the fade-in/fade-out time, the titles of the pieces of music to be reproduced, and the order of the pieces of music simultaneously as the medley editing condition has been explained in the above-mentioned embodiment, since the distinguishing ability for the receipt state of the portable telephone devices of oneself or of another one can be improved as long as either one in the editing condition is different from that of the other's portable telephone device, a combination of the items in the medley editing condition can be provided as another embodiment of the invention.

Moreover, although the operation method of selecting melodies from a melody memory with the upper scroll key 11a, the lower scroll key 11b and the confirmation key 11e has been explained, since the title of each melody is indicated on the display part 15 with a number, the operation method of selection by inputting the number of the corresponding piece of music with the ten keys 22 can be adopted, with the control program of the control part 3 describing the procedure provided.

Furthermore, as still another embodiment of the invention, by adding a monitor reproduction mode in the operation control mode of the control part 3 for the monitor reproduction independently from the ordinary reproduction mode at the time of receipt, the melody data stored in the melody memories can be reproduced according to the reproduction command of the user at any time from the melody memory storing the desired melody like a music CD or a music MD. In particular, by replacing the melody memory of the external memory device by one storing new melodies, it is possible to always listen to the latest melodies.

As heretofore explained, according to the embodiment, by setting the editing condition for reproducing a plurality of receipt melodies as a medley, utilizing receipt melodies preliminarily registered in the melody memories, in the case of reproducing the receipt sound at the time of receipt, a plurality of melody data can be read out successively based on the set editing condition for the medley reproduction. Therefore, even in the case another user having a portable telephone device with the same pieces of music preliminarily registered is nearby, since the medley setting can rarely be same, it is easily distinguished if the portable telephone device of oneself is receiving a call or the portable telephone device of another one is receiving a call. Moreover, by presetting the editing condition including the number of pieces of music in the medley reproduction, the introduction scan time, the fade-in/fade-out time, the titles of the pieces of music to be reproduced, and the order of the pieces of music, the medley editing operation can be executed easily only by setting the editing condition.

Furthermore, by handling the built-in melody memory and the melody memory of the detachable external memory device in the same manner, an optional change can be enabled, for example, the content of the receipt melodies can always be the latest ones by replacing the melody memory according to the trend or the taste.

As heretofore explained, according to the invention, since a plurality of receipt melodies preliminarily registered in an optional combination can be reproduced as a medley so as to improve the distinguishing ability as to the receipt state for one's own device, the effect of easily distinguishing the receipt sounds of oneself and another one can be achieved even in the case a plurality of devices exist nearby.

What is claimed is:

1. A telephone terminal device comprising:
   a melody data memory means for storing melody data,
   a sound data processing means for reproducing the melody data as the sound, and
   a medley editing and reproducing means for reproducing groups of melodies each comprising a plurality of melody data stored in the melody data memory means as an edited medley based on a preset editing condition at the time of reproducing a receipt sound,
   wherein the melody data memory means stores the melody data per each group, and stores the medley editing conditions corresponding to each melody data group.

2. The telephone terminal device according to claim 1, wherein the medley editing and reproducing means sets the number of pieces of music in the medley reproduction as the editing condition for editing and reproducing the melody data based on the editing condition.

3. The telephone terminal device according to claim 1, wherein the medley editing and reproducing means sets the reproduction time for each piece of music in the medley reproduction as the editing condition for editing and reproducing the melody data based on the editing condition.

4. The telephone terminal device according to claim 1, wherein the medley editing and reproducing means sets the fade-in/fade-out time for each piece of music in the medley reproduction as the editing condition for editing and reproducing the melody data based on the editing condition.

5. The telephone terminal device according to claim 1, wherein the medley editing and reproducing means sets the titles of the pieces of music in the medley reproduction as the editing condition for editing and reproducing the melody data based on the editing condition.

6. The telephone terminal device according to claim 1, wherein the medley editing and reproducing means sets the order of the pieces of music in the medley reproduction as the editing condition for editing and reproducing the melody data based on the editing condition.

7. The telephone terminal device according to claim 1, wherein the medley editing and reproducing means sets a combination of at least two selected from the group consisting of the number of pieces of music, the reproduction time for each piece of music, the fade-in/fade-out time for each piece of music, the titles of the pieces of music, and the order of the pieces of music in the medley reproduction as the editing condition for editing and reproducing the melody data based on the editing condition.

8. The telephone terminal device according to claim 1, wherein the melody data memory means includes a built-in first memory device provided fixedly in the telephone terminal device, and a second memory device connected detachably to the medley editing and reproducing means.

9. The telephone terminal device according to claim 1, wherein the medley editing and reproducing means has an ordinary reproduction mode for reproducing a medley of pieces of music based on the melody data at the time of receipt, and a monitor reproduction mode for reproducing the melody data according to the reproduction command as the operation modes for, reproducing the receipt sound.

* * * * *